Sept. 24, 1940.                H. SCHAEFER                2,215,718
                               ELECTRIC FENCE
                             Filed July 30, 1937
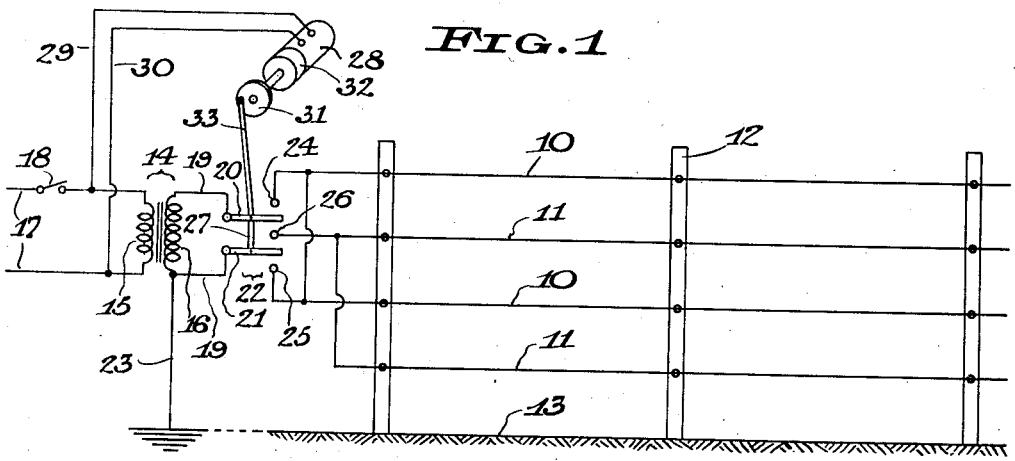
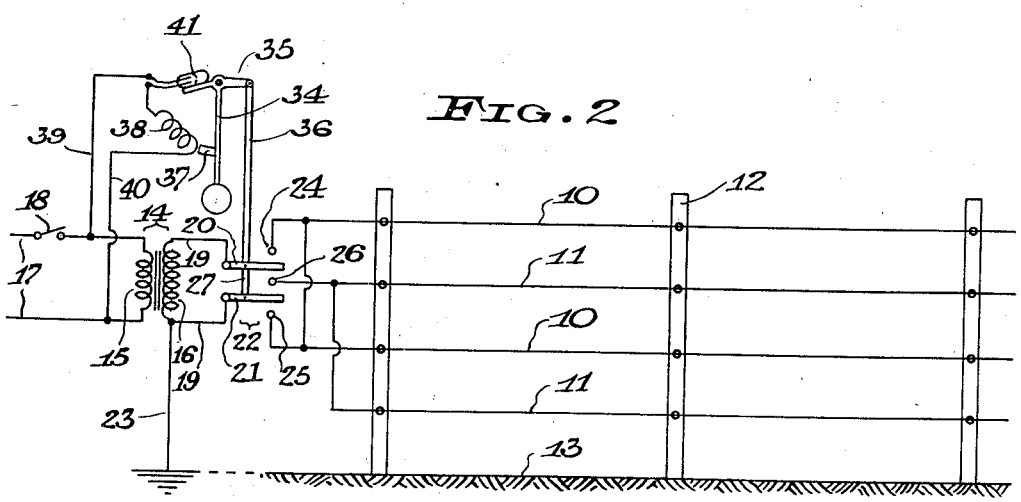
WITNESSES
L. E. Kilian
C. L. Waal
INVENTOR
Harvey Schaefer
By R. S. Caldwell
                    ATTORNEY Patented Sept. 24, 1940

2,215,718

UNITED STATES PATENT OFFICE 2,215,718

ELECTRIC FENCE

Harvey Schaefer, Appleton, Wis.

Application July 30, 1937, Serial No. 156,432

2 Claims. (Cl. 256—10)

The present invention relates to electric fences, such as are used for preventing the passage of live stock.

Fences have heretofore been constructed with electrically charged wires to repel live stock, and in many instances the ground has been used as the return conductor. In dry weather, the ground, and especially the surface thereof, may become unreliable as a conductor with the result that a fence of this character may fail to operate as intended. In an attempt to avoid this objection, a metallic return has been used on an electric fence, in substitution of, or in addition to, the ground, but this expedient is not entirely satisfactory. If the bottom wire is grounded, small animals, such as hogs, will not be affected, and if the top wire is grounded, large animals, such as cattle and horses, may hang over the wire to feed on the other side of the fence, without being affected. If the fence has more than two wires and an intermediate wire is grounded, an animal touching this wire will not be shocked unless the animal is also in contact with a charged wire. If by accident certain of the insulated wires of any one of these fences should become grounded, it would be impossible to charge the fence.

An object of the invention is to provide an improved electric fence which is effective to repel animals of various sizes under the varying conditions encountered.

Another object of the invention is to provide an improved systetm of energizing the fence wherein the fence wires are alternately charged and grounded, that is, in one time interval, one wire will be charged and another grounded, and in another time interval, the first wire will be grounded while the second wire is charged, thus enhancing the effectiveness of the fence.

A further object is to intermittently drain off to ground electric charges collecting on the fence.

A still further object is to provide intermittently operating fence-charging switch means of such character as to avoid a continuous charge on the fence wires if the switch-actuating means should cease or fail to operate.

The invention further consists in the several features hereinafter described and claimed.

Certain embodiments of the invention are illustrated in the accompanying drawing, wherein Fig. 1 is a schematic view of an electric fencing system embodying the invention, and Fig. 2 is a schematic view of another form of electric fencing system.

In the drawing, 10 and 11 designate a plurality of fence wires supported in vertically spaced insulated relation on fence posts 12 driven in the ground 13. Two or more wires may be used, but by way of example, two pairs of wires are shown, the alternate wires 10 and 11 being respectively connected in parallel.

In accordance with the invention, the wires 10 and 11 are charged and grounded alternately, that is, in one time interval, the wires 10 are charged while the wires 11 are grounded, and in another time interval the wires 11 are charged while the wires 10 are grounded. Also, between the charging intervals, all wires are free of charge for an interval, so as to obtain more effective shocking and to facilitate voluntary release of an animal from contact with the wires.

The fence wires are electrically charged or energized by apparatus of any suitable type, here shown to include a transformer 14 having a primary winding 15 and a secondary winding 16. The primary winding 15 is connected to supply mains 17 through a switch 18, and the secondary winding 16, wound to produce a suitable high voltage, is connected by leads 19 to respective movable contact arms 20 and 21 of a distributing or shifting switch 22. One end of the secondary winding is connected to ground by a conductor 23. The fence wires 10 are connected to outer contacts 24 and 25 of the switch 22, and the fence wires 11 are connected to an intermediate switch contact 26. The two switch arms 20 and 21 are joined by an insulating tie bar 27.

When the switch arms 20 and 21 are moved upwardly they engage the upper contact 24 and the intermediate contact 26, respectively, thereby charging the fence wires 10 and grounding the fence wires 11. In a similar manner, when the switch arms are moved downwardly, the fence wires 10 are grounded through the switch arm 21 engaging the contact 25, and the fence wires 11 are charged through the switch arm 20 engaging the contact 26. When the switch arms are in an intermediate position, the switch is open, so that none of the fence wires are charged.

Means are provided for automatically operating the distributing switch 22 and may take various forms.

In the form of switch-operating means shown in Fig. 1, an electric motor 28 is connected to the mains by conductors 29 and 30 and drives a crank disk 31 through a speed-reducing transmission 32, the crank disk being joined to the switch arms by a connecting rod 33 to reciprocate the switch arms.

In the form of switch-operating means shown in Fig. 2, an oscillatory momentum device is employed, and by way of example is here shown to comprise a pendulum 34 carrying an arm 35 joined to the switch arms by a connecting rod 36. The pendulum has an armature 37 which is periodically attracted by a solenoid coil 38, the coil being energized from the mains 17 through conductors 39 and 40. A switch 41, such as of the mercury tube type, is carried on the pendulum and is placed in the conductor 39 to periodically open the excitation circuit. When the pendulum is in its intermediate position the distributing switch is open, and the mercury tube switch 41 is closed, so that the pendulum is self-starting. The switch 41 opens when the pendulum swings to the left as viewed in Fig. 2. If the pendulum-driving means should fail for any reason, the pendulum will hang at rest in its intermediate position, and the distributing switch will remain open, so as to prevent the fence wires from being continuously charged from the secondary winding of the transformer.

In operation, with the main switch 18 closed, the distributing switch arms 20 and 21 are oscillated by the driving mechanism of Figs. 1 or 2. On their upward movement, the switch arms connect the fence wires 10 to the charging end of the transformer secondary 16 and connect the fence wires 11 to the grounded end of the secondary. An animal coming in contact with either of the charged fence wires 10 will then receive a shock, and an animal coming in contact with either of the charged fence wires 10 and with either of the fence wires 11, as by reaching through the space between any two adjacent fence wires, will likewise receive a shock, whether or not the ground is in good conducting condition. On their downward movement, the switch arms disconnect all the wires 10 and 11 from the transformer secondary so that an animal in contact with the fence will not receive a continuous shock, allowing voluntary release of the animal from the fence when the current is off. On their further downward movement, the switch arms connect the fence wires 11 to the charging end of the transformer secondary and connect the fence wires 10 to the grounded end of the secondary, thus reversing the previous condition of charge, the fence wires which were previously grounded now being charged and the fence wires which were previously charged now being grounded. An animal coming in contact with the fence will be shocked, as in the previous case. The switch arms are then moved upwardly, and the cycle of operation is repeated.

The frequency of switch operation may have any suitable value, such as 30 to 90 cycles per minute. The intervals in which the distributing switch contacts are in engagement are preferably as long or longer than the intervals in which they are out of engagement. This relation can be produced by making the switch arms, or the contacts, or both, of resilient character. However, the contact intervals can be made relatively short, if desired. The ground connection to the fence wires is preferably established before the charging connection. The current through the fence wires is preferably limited to a safe value, as by making the transformer secondary of high resistance. If any one of the fence wires should become and remain accidentally grounded, the intermittent charging voltage will still be impressed on the ungrounded wires.

As is well understood in this art, suitable means, not shown, may be provided to indicate the presence of charging voltage on the fence wires and to indicate the flow of current through these wires.

While two forms of switch operating means have been shown, it will be obvious that other well known operating means, such as thermostatic means, may also be used.

When the ground is in good conducting condition, an animal standing thereon and touching any one of the fence wires will receive a shock, and if the ground should become too dry to be an effective conductor, an animal touching any two adjacent fence wires will likewise receive a shock. All the wires are intermittently grounded, so as to drain off any electrical charges which collect on the wires. The ground connection for the fence wires is preferably of relatively low resistance.

What I claim as new and desire to secure by Letters Patent is:

1. In an electric fence, the combination of a pair of companion fence wires, means for charging said wires in alternation, and means for causing the uncharged wire to form a return conductor at substantially ground potential.

2. In an electric fence, the combination of a pair of companion fence wires, means for impressing a charging voltage first between one of said wires and the ground and then between the other wire and the ground, and means for grounding each of said wires in the intervals in which the other wire is charged.

HARVEY SCHAEFER.